United States Patent [19]

Hughes

[11] Patent Number: 4,586,053
[45] Date of Patent: Apr. 29, 1986

[54] LASER BEAM PRODUCT MARKING SYSTEM

[75] Inventor: John L. Hughes, Canberra, Australia

[73] Assignee: Australian Electro Optics Pty. Limited, Canberra, Australia

[21] Appl. No.: 610,715

[22] Filed: May 16, 1984

[30] Foreign Application Priority Data

May 18, 1983 [AU] Australia .............................. PF9408

[51] Int. Cl.⁴ .......................... G01D 9/00; G01D 9/42
[52] U.S. Cl. .................................... 346/1.1; 346/108; 346/110 R; 358/237
[58] Field of Search ............... 346/110 R, 108, 107 R, 346/160, 1.1; 358/236, 237, 258, 347, 293

[56] References Cited

U.S. PATENT DOCUMENTS

| | | | |
|---|---|---|---|
| 3,506,782 | 4/1970 | Anwyl | 358/236 |
| 3,723,651 | 3/1973 | Gorog | 358/236 |
| 3,990,783 | 11/1976 | Kohashi | 358/236 |
| 4,467,335 | 8/1984 | Schmidt | 346/108 |

Primary Examiner—E. A. Goldberg
Assistant Examiner—Mark Reinhart
Attorney, Agent, or Firm—Townsend & Townsend

[57] ABSTRACT

The invention concerns a system for marking information on items particularly mass produced items. The message to be marked is generated on a high resolution cathode ray tube screen. The image is then coupled into the input end of a liquid crystal light valve and the incoherent image converted to a coherent image by using a laser beam and then separated by a light polarizer into positive and negative images. The separated images are then used to mark a message on the surface of an object.

10 Claims, 3 Drawing Figures

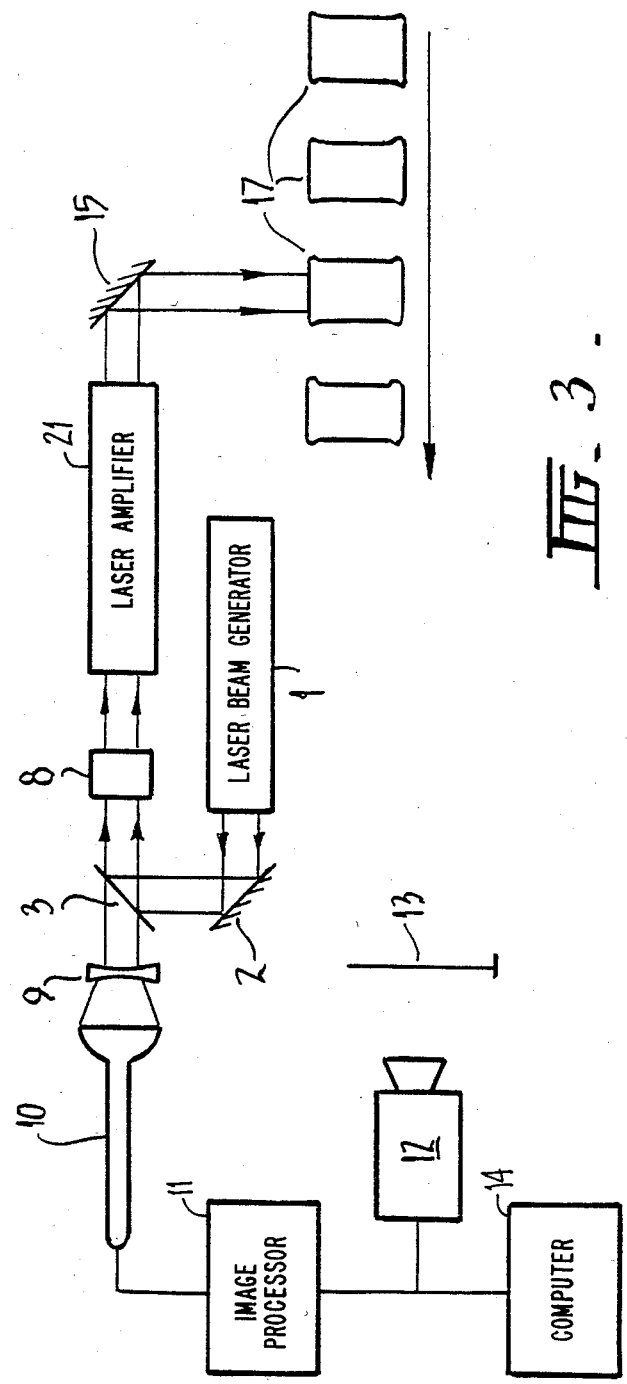

LASER BEAM PRODUCT MARKING SYSTEM

FIELD OF THE INVENTION

This invention relates to a system utilizing an image superimposed onto a laser beam to mark mass produced items. The system may use a laser beam generator, laser beam amplifier, polarized optical components, a liquid crystal light valve, a high resolution cathode ray tube, image processor, a computer, laser beam focussing lens, laser beam reflecting mirror and laser beam parameter monitoring devices.

DESCRIPTION OF THE PRIOR ART

Prior art laser marking systems have come in three forms; firstly, the message to be marked was cut out of a suitable material, for example a steel plate, so that a laser beam irradiating said material passed through the cut portion to burn an object surface against which the said plate was placed; secondly, a stationary laser beam can mark and trace out a message on a material surface which is appropriately moved relative to said fixed laser beam and thirdly, the surface to be marked is kept stationary whilst the laser beam is scanned to trace out the message.

SUMMARY OF THE INVENTION

In this invention the message to be marked onto an object surface is first of all generated on a high resolution cathode ray tube screen. This image is then optically coupled into the input end of a liquid crystal light valve, for example a liquid crystal light valve of the type manufactured by the Hughes Aircraft Company in the United States. This optical coupling may be achieved either via lenses or via a coherently packed optical fibre bundle. The incoherent image on the cathode ray tube screen is then converted into a coherent, laser beam image by using a laser beam to scan the output end of the liquid crystal light valve and passing the output laser beam through a light polarizer which separates the positive and negative images. Each one of the separated images can then be used to mark a message onto the surface of an object either by focussing the said laser beam onto a small spot to achieve the required intensity to mark the said surface or by passing the selected image through a series of laser amplifiers until the required beam intensity for laser marking of the object surface is attained.

It is an aim of this invention to produce a real time stencil for the laser beam marking of mass produced items at a rate of 25 messages of the same or completely different types per second.

It is also the aim of this invention to transfer a high resolution image displayed on the screen of a cathode ray tube, via a liquid crystal light valve and intense laser beam, onto the surface of any solid object.

It is the further aim of this invention to increase the laser beam image intensity via lens or mirror focussing to attain a level whereby the immage can be marked onto the surface of objects.

It is also a further aim of this invention to increase the laser beam image intensity via laser beam amplifiers to a level whereby the image can be marked onto the surface of objects without the use of lenses or mirrors.

A further aim of this invention is to provide zero relative motion between the laser beam and the object to be marked during the marking process so that the sharpest image is produced.

Yet a further aim of this invention is to provide stepped relative motion between the laser beam and the object to be marked so that a composite message or picture can be imprinted onto the object surface during the marking process.

BRIEF DESCRIPTION OF THE DRAWINGS

A better understanding of this invention may be obtained from consideration of the following drawings which are not meant to limit the scope of my invention.

FIG. 3 shows a form of the invention where the required marking intensity is achieved by amplifying the laser beam image via a laser beam amplifier but with the liquid crystal light valve being used in the transmission mode of operation.

DETAILED DESCRIPTION

Figure 1:
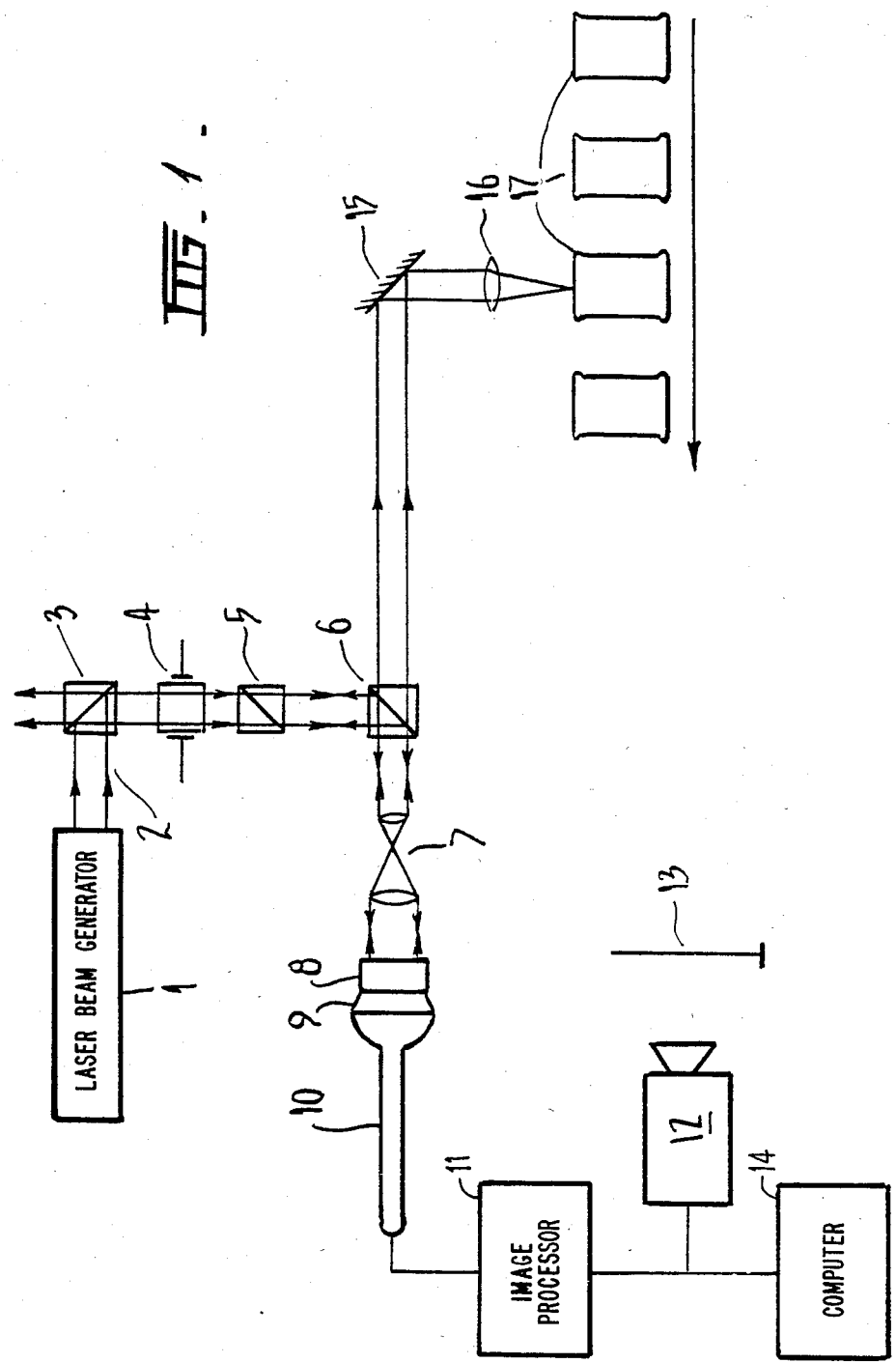
FIG. 1 shows a form of the invention where the required marking intensity is achieved by focussing the laser beam image onto the surface of the object to be marked with the liquid crystal light valve being used in the reflective mode of operation.

In FIG. 1, numeral 1 indicates the laser beam generator, numeral 2 indicates the polarized laser beam which is reflected via a cubic polarizer indicated by numeral 3 into the Faraday rotator indicated by numeral 4. The polarized laser beam then passes through a second polarizer indicated by numeral 6, via a telescope indicated by numeral 7 into the liquid crystal light valve, indicated by numeral 8, from which it is reflected back along its path of incidence to cubic polarizer 6. Liquid crystal light valve 8 is connected to a high resolution cathode ray tube indicated by numeral 10, via an optical fibre bundle indicated by numeral 9.

The image displayed on the screen of the cathode ray tube 10 is generated either via a high resolution television camera indicated by numeral 12 which picks up the image on pattern card indicated by numeral 13 or via the computer indicated by numeral 14. Both generated images are processed via the image processor indicated by numeral 11 before being displayed on the screen of cathode ray tube 10.

Having transferred the high resolution, incoherent image on cathode ray tube 10 via optical fibre coupler 9 into liquid crystal light valve 8 where it is superimposed on the coherent laser beam which has been expanded via telescope 7, the laser beam now containing the image, is passed back through telescope 7 into cubic polarizer 6. As the laser beam reflected by the liquid crystal light valve 8 passes through cubic polarizer 6, those portions of the beam whose polarization were unaffected by the liquid crystal light valve 8, retrace the optical path back through polarizer 5 and rotator 4 and is then ejected out of the system via polarizer 3. However, those portions of the laser beam whose polarization was affected by the liquid crystal light valve, pass through cubic polarizer 6 onto the reflector indicated by numeral 15, through the lens indicated by numeral 16 onto containers to be marked and indicated by numeral 17.

Figure 2:
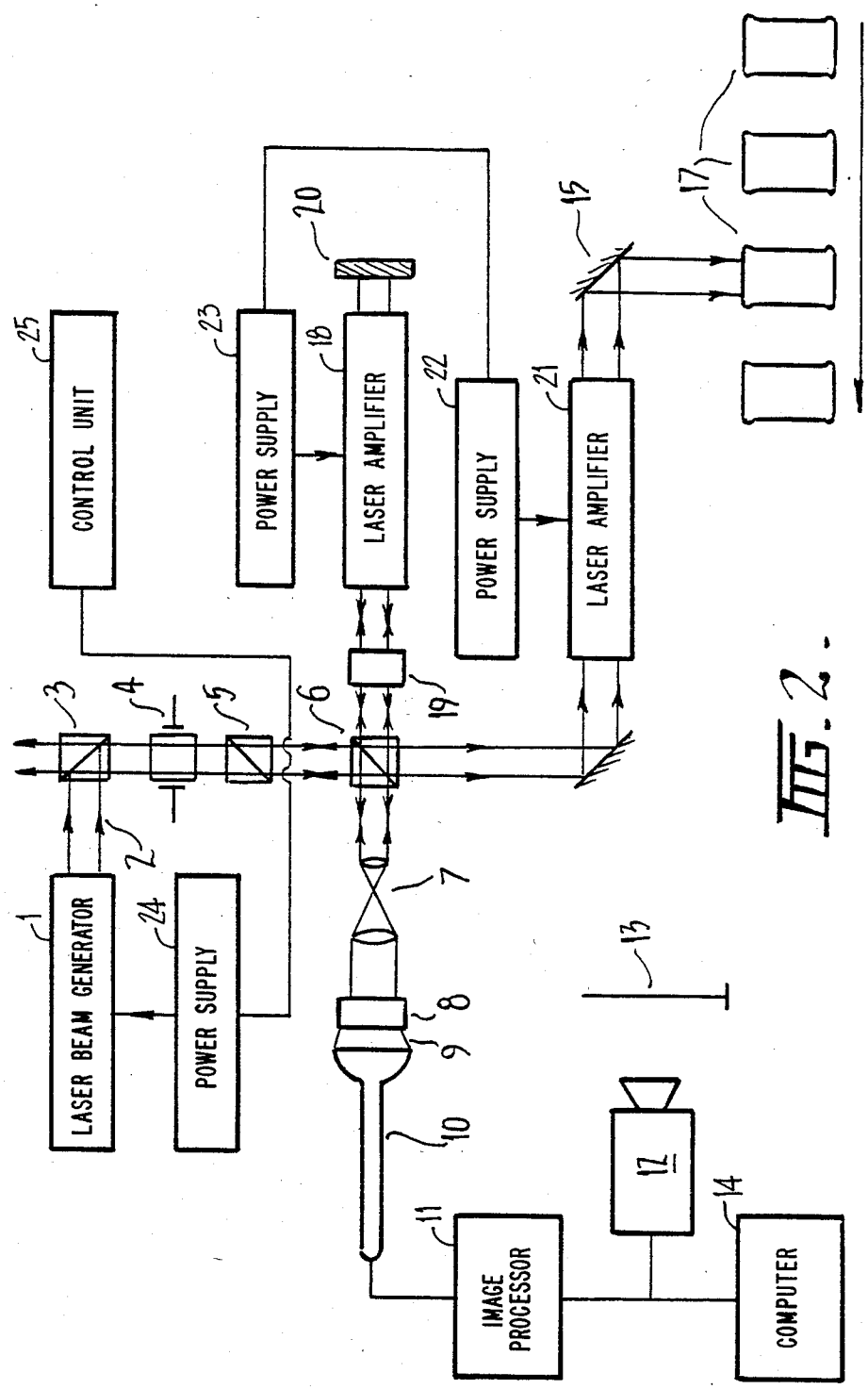
FIG. 2 shows a form of the invention where the required marking intensity is achieved by amplifying the laser beam image via a series of laser beam amplifiers, with the liquid crystal light valve being used in the reflective mode of operation.

In FIG. 2, additional optical equipment has been added compared to the components of FIG. 1, in order to increase the intensity of the laser beam image to a level that object surfaces can be marked without the use of a lens. After the laser beam image leaves cubic polarizer 6, it passes through a quarterwave plate indicated by numeral 19 through a laser amplifier indicated by numeral 18 and is reflected by a mirror indicated by numeral 20. The amplified laser beam image is then returned through amplifier 18 and back through quarterwave plate 19 from which it emerges with its plane of polarization rotated by 90°. The image is then ejected from the system via cubic polarizer 6 to pass through a second amplifier indicated by numeral 21, then onto the item 17 via mirror 15. Power supplies indicated by numerals 22, 23 and 24 drive the laser beam generator 1, double pass amplifier 18 and single pass amplifier 21 respectively whilst the whole laser system is controlled from a control unit indicated by numeral 25.

FIG. 3 indicates the transmissive mode of operation of the invention where the liquid crystal light valve 8 is separated from the high resolution cathode ray tube 10 such that a laser beam from generator 1 can pass into and through the liquid crystal light valve 8 and into laser amplifier 21 where the laser beam image is amplified to an intensity level where it can be used to mark items 17 via mirror 15. In this mode of operation the laser wavelength must be such as not to affect the optical sensitivity of the input end of the liquid crystal light valve 8, otherwise the incoherent to coherent image transfer process cannot take place.

Care is necessary with currently available liquid crystal light valves to ensure that the laser beam intensity entering the liquid crystal light valve is not high enough to damage the valve. This is also true of any back-reflected laser light from the amplifiers and associated optical components. When these levels become excessive, electro- or magneto-optic switches have to be included in the optical circuits to cut down the level of laser light to levels acceptable for the safe operation of currently available liquid crystal light valves. Also it is necessary to ensure that the amplification of the laser beam image through the laser amplifiers does not unduly distort the image through effects such as flashtube induced shockwaves of thermally induced gradients within the amplifier medium whether they are solid, gaseous or liquid.

For the best results using the invention, the image displayed on the high resolution cathode ray tube screen must be of the highest possible quality. Image processor 11 is used to ensure the best possible quality of screen display as derived from either television camera or computer generated images.

Currently available liquid crystal light valves can operate at up to 60 frames per second so that up to 60 different images can be marked onto object surfaces using a single valve. Furthermore, the complexity of each image can be very high, for example a pictorial scene can be transferred onto an object surface in a single frame so that up to 60 different pictorial scenes may be marked per second.

In practice, it is difficult to introduce mass produced items under the laser beam at a rate exceeding about six per second. This means that up to ten identical frames can be used for a particular marking process since the laser beam and the object to be marked have to be locked relative to each other during the marking process. Alternatively, a composite marking sequence may be set up by stepping the laser beam and object relative to each other during the locking and marking process.

This invention has implication in marking any item, in particular mass produced items, so that different information can be placed on each to fully identify it. For example, this invention can be used to identify mark semiconductor products such as transistors and integrated circuits, tools, milk cartons, soft drink bottles, medical packs and jewels.

I claim:

1. A method for marking objects with an image displayed on an incoherent optical display device, comprising the steps of:
   optically coupling said image into a liquid crystal light valve;
   directing a polarized laser beam into said liquid crystal light valve thereby superimposing said image onto said polarized laser beam;
   extracting those portions of said laser beam whose polarization was affected by the liquid crystal light valve; and
   irradiating said object with the part of said laser beam which has been extracted by said extracting step, thereby marking said image onto said object.

2. The method of claim 1, wherein the irradiating step comprises:
   increasing the intensity of said laser beam by focusing said laser beam onto the object to be marked.

3. The method of claim 1 wherein the irradiating step comprises:
   increasing the intensity of said laser beam by amplifying said laser beam.

4. The method of claim 1, further comprising the steps of:
   marking said object with a sequence of identical images; and
   maintaining zero relative motion between the laser beam and the object to be marked.

5. The method of claim 1, further comprising the steps of:
   providing stepped relative motion between the laser beam and the object to be marked; and
   marking said object with a series of different images.

6. An apparatus for marking objects with an image displayed on an incoherent optical display device, comprising:
   a liquid crystal light valve;
   means for generating a polarized laser beam directed into said liquid crystal light valve;
   means for optically coupling said image to said liquid crystal light valve;
   a second polarizer positioned in the path of said laser beam after said liquid crystal light valve; and
   means for irradiating said object with the part of said laser beam which passes through said second polarizer, thereby marking said image onto said object;
   whereby said incoherent image is superimposed on said laser beam by said liquid crystal light valve and the portions of said laser beam whose polarization is affected by said liquid crystal light valve are passed through said second polarizer and used to irradiate said object.

7. The apparatus of claim 6, wherein said means for irradiating said object comprises:
   a lens positioned in the path of said laser beam after said second polarizer, for focusing said laser beam onto said object.

8. The apparatus of claim 6 wherein said means for irradiating said object comprises:
   a laser beam amplifier positioned in the path of said laser beam, after said second polarizer, for increasing the intensity of said laser beam.

9. The apparatus of claim 6 wherein said liquid crystal light valve is used in the reflection mode.

10. The apparatus of claim 6 wherein said liquid crystal light valve is used in the transmissive mode.

* * * * *